(12) United States Patent
gr. Kohorst

(10) Patent No.: US 8,375,821 B2
(45) Date of Patent: Feb. 19, 2013

(54) ACTUATING DEVICE

(75) Inventor: Berthold gr. Kohorst, Vechta (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 179 days.

(21) Appl. No.: 12/525,185

(22) PCT Filed: Feb. 5, 2008

(86) PCT No.: PCT/DE2008/000202
§ 371 (c)(1),
(2), (4) Date: Jul. 30, 2009

(87) PCT Pub. No.: WO2008/101463
PCT Pub. Date: Aug. 28, 2008

(65) Prior Publication Data
US 2010/0031766 A1    Feb. 11, 2010

(30) Foreign Application Priority Data
Feb. 21, 2007  (DE) .................. 10 2007 008 961

(51) Int. Cl.
*B60K 20/00*    (2006.01)
*F16H 59/04*   (2006.01)
*G05G 9/00*    (2006.01)
*F16C 11/00*   (2006.01)

(52) U.S. Cl. .............. 74/473.34; 403/141; 74/473.3; 74/473.1

(58) Field of Classification Search .......... 74/473.1, 74/473.12, 473.21–473.3, 473.34; 384/202, 384/203, 206; 403/141, 142, 143
See application file for complete search history.

(56) References Cited

U.S. PATENT DOCUMENTS

| 86,173 A | * | 1/1869 | Maynard ................ 403/123 |
| 687,183 A | * | 11/1901 | Kolander ............... 403/141 |
| 782,330 A | * | 2/1905 | Foster .................... 403/143 |
| 985,906 A | * | 3/1911 | Jones ..................... 403/141 |
| 1,712,938 A | * | 5/1929 | Short et al. ............ 74/473.1 |
| 1,883,782 A | * | 10/1932 | Graham ................ 403/137 |
| 1,883,882 A | * | 10/1932 | Davis .................... 403/139 |

(Continued)

FOREIGN PATENT DOCUMENTS

DE  33 07 950 A1    9/1983
DE     3307950 A  *  9/1983

(Continued)

OTHER PUBLICATIONS

Japanese Office Action—Dated Aug. 30, 2012 and English Translation.

*Primary Examiner* — Justin Krause
(74) *Attorney, Agent, or Firm* — Davis & Bujold, PLLC

(57) ABSTRACT

An actuating device comprising an actuating element that is moved by a ball stud relative to a base comprising a ball socket. The actuating element can move relative to the base, within at least one pivot plane, between at least two shift positions. At least one recess of the ball socket has an elastic surface area which is flexible in the direction along the radius of the ball socket. The flexible elastic surface area has a centrally arranged pressure contact element, which bears against the joint ball. In a neutral position of the elastic surface area, the contact surface of the pressure contact element is at a distance away from the mid-point of the ball socket which is smaller than the radius of the joint ball, such that it possible to produce actuating devices which are robust in operation and free from play.

13 Claims, 2 Drawing Sheets

U.S. PATENT DOCUMENTS

| | | | | |
|---|---|---|---|---|
| 2,010,367 A | * | 8/1935 | Lapsley | 403/20 |
| 3,530,495 A | * | 9/1970 | Kindel | 403/140 |
| 3,667,681 A | * | 6/1972 | Blancha | 239/393 |
| 3,707,094 A | * | 12/1972 | Herbenar et al. | 74/473.34 |
| 3,845,735 A | * | 11/1974 | Bossler, Jr. | 116/208 |
| 4,132,124 A | * | 1/1979 | Iida | 74/473.34 |
| 4,206,826 A | * | 6/1980 | McMillen et al. | 180/328 |
| 4,333,360 A | * | 6/1982 | Simmons | 74/473.34 |
| 4,511,277 A | * | 4/1985 | McCabe | 403/140 |
| 4,519,268 A | | 5/1985 | Oda | |
| 4,569,245 A | | 2/1986 | Feldt et al. | |
| 5,706,701 A | * | 1/1998 | Murakami | 74/335 |
| 5,772,352 A | * | 6/1998 | Fukumoto et al. | 403/144 |
| 6,713,223 B2 | * | 3/2004 | Kuhn et al. | 430/135 |
| 6,761,499 B2 | * | 7/2004 | Bohne et al. | 403/14 |
| 7,427,113 B2 | * | 9/2008 | Choi | 301/124.1 |
| 7,674,063 B2 | * | 3/2010 | Jan et al. | 403/145 |
| 7,921,746 B2 | | 4/2011 | Giefer et al. | |
| 8,152,186 B2 | * | 4/2012 | Jeong | 280/124.134 |
| 2003/0002914 A1 | * | 1/2003 | Ueno | 403/143 |
| 2008/0138151 A1 | * | 6/2008 | Schilz et al. | 403/141 |

FOREIGN PATENT DOCUMENTS

| | | |
|---|---|---|
| DE | 102 04 277 A1 | 8/2003 |
| JP | 51093079 U | 7/1976 |
| WO | 2007009415 A1 | 1/2007 |

* cited by examiner

ACTUATING DEVICE

This application is a National Stage completion of PCT/DE2008/000202 filed Feb. 5, 2008, which claims priority from German patent application serial no. 10 2007 008 961.0 filed Feb. 21, 2007.

FIELD OF THE INVENTION

The invention concerns an actuating device for the manual actuation, in particular, of a gearshift transmission.

BACKGROUND OF THE INVENTION

Actuating devices of this type are used, for example but by no means exclusively, for the manual selection of gear ratios or for gear preselection in gearshift transmissions of motor vehicles. With such actuating devices, which can consist in particular of an actuating or selector lever for an automatic transmission, positioned between the front seats of a motor vehicle, it is important to ensure that the actuating lever is mounted as free from play as possible so that the various functional positions of the actuating lever can be engaged by the operator or driver of the vehicle confidently and with trustworthy tactile feedback. Mounting of the actuating lever so as to be free of play is also important since in this way undesired rattling noise from the actuating lever is avoided.

The latter aspect plays an important part especially in the case of actuating devices for gearshift transmissions since gearshift or selector levers, compared with most other actuating devices in motor vehicles, have comparatively large dimensions and a comparatively high mass. For this reason, precisely in the case of actuating devices for manual and automatic transmissions the design should pay particular attention to consistent play-free guidance of the actuating lever. However, especially since the mountings for such actuating levers are increasingly made from plastic, it is often difficult and comparatively complicated and expensive to create a mounting which on the one hand is free from play and on the other hand remains easy to manipulate.

Actuating devices with actuating levers mounted free from play are known from the prior art. For example, DE 33 07 950 A1 shows an actuating device for a manual transmission of a motor vehicle, in which the shift lever is held by means of a ball stud in a corresponding ball socket in the base housing of the actuating device. In this actuating device known from the prior art the ball socket is made in two parts and comprises an additional elastic ring which presses the ball stud associated with the actuating lever into the ball socket in the base housing of the actuating device, so that any play existing between the joint ball and the ball socket is eliminated.

However, such actuating devices known from the prior art are complex and therefore tend to be expensive, because they comprise numerous components and because they need to be adjusted and assembled with care so as to eliminate any play.

SUMMARY OF THE INVENTION

Against this background, the purpose of the present invention is to provide an actuating device with an actuating element, for example to actuate a manual transmission of a motor vehicle, by virtue of which the disadvantages of the prior art can be overcome. In particular, the actuating device should enable enduringly play-free guiding and mounting of the actuating element in the base housing of the actuating device, but should comprise a minimum of individual components and should enable substantial cost saving in its production and assembly.

The actuating device according to the invention comprises, in a manner already known per se, an actuating element which can be moved to at least two shift positions. For this, the actuating element is mounted movably by means of a ball stud in a base housing of the actuating device, this base housing of the actuating device comprising a ball socket with a shape complementary to that of the ball stud.

According to the invention, however, the ball socket is characterized in that it comprises at least one recess containing prestressing means with an elastic surface zone which is flexible in the radial direction of the ball socket. The flexible elastic surface zone comprises a pressure contact element arranged substantially centrally on the surface zone, which can be brought to bear against the ball stud of the actuating element. In this case, in the force-free, neutral position of the prestressing means the contact surface of the pressure contact element that can be brought to bear against the ball stud is a distance away from the mid-point of the ball socket or the ball stud which is smaller than the radius of the ball stud.

In other words, this means that the ball stud is held without play in the ball socket by the prestressing means arranged in the ball socket. That is because the bearing surface formed by the contact surface of the pressure contact element is pressed by the ball stud outward and away from its force-free, neutral position. This produces a corresponding reaction force directed back toward the ball stud, which presses the ball stud into the ball socket.

In this way it is advantageously possible for the production accuracy of the ball stud and/or the ball socket to be reduced without adverse effect upon the quality and life of the actuating device, and without having to expect a less precise tactile "feel" of the actuating device. At the same time, moreover, a permanently play-free and rattle-free mounting and holding of the ball stud in the ball socket is ensured. Accordingly, not only the ball stud but in addition the actuating element—for example the selector lever of a vehicle transmission—is also held, free from play and without rattling, in the base housing of the actuating device.

First of all, the invention can be implemented regardless of how the ball socket and the prestressing means are designed, always provided that when moved away from its force-free, neutral position the flexible elastic surface zone of the prestressing means exerts restoring forces sufficiently high to hold the ball stud without play in the ball socket.

In a preferred embodiment of the invention, however, the ball socket consists essentially of two spherical half-shells, with the recess containing the flexible elastic surface zone and the pressure contact element in one of the two half-shells.

Preferably, both the pressure contact element and the flexible elastic surface zone are made integrally with the ball socket half-shell. This enables exceptionally cost-effective production both of the ball socket and of the prestressing means formed by the flexible elastic surface zone and the pressure contact element, as a single piece. This is a decided advantage when the base housing of the actuating device or the ball socket half-shells are made of plastic, as in increasingly the case with actuating devices, for example in motor vehicles.

According to another preferred embodiment the base is formed essentially of two housing halves. In this case each of these two housing halves is formed integrally with one of the two respective ball socket half-shells. This reduces the production cost of the base housing of the actuating device still further, since thereby the housing, the shift lever mounting and the prestressing means for play-free mounting of the shift lever can all be made with only two, in each case integrally formed plastic half-shells. Furthermore, in this way a greatly simplified, play-free final assembly of the housing halves that comprise the ball socket—together with the joint ball and the shift lever—can take place without any need for subsequent adjustment of the shift lever mounting. Compared with the prior art, this saves considerable costs.

Particularly preferably, the flexible elastic surface zone of the prestressing means is formed by a membrane that is flat in the force-free, neutral position of the prestressing means, the membrane being clamped or integrally connected to the associated ball socket half-shell essentially along the whole of its outer circumference.

This embodiment also enables the prestressing means together with the associated socket half-shell to be designed and produced in a particularly simple and cost-effective manner.

The design of the flexible elastic surface zone in accordance with the above embodiment as a membrane clamped essentially all the way round, is particularly advantageous in that, in this way, it results in sufficiently large contact pressure forces between the pressure contact element and the ball stud even with minimal deflection of the membrane. This is because when the membrane is deflected, owing to the clamping of the membrane around the whole of its outer circumference substantial tensile forces are produced in the plane of the membrane, whereby in turn the restoring force exerted by the membrane and needed to ensure play-free holding of the ball stud acts perpendicularly to the plane of the membrane, in the direction toward the ball stud.

BRIEF DESCRIPTION OF THE DRAWINGS

Below, the invention is explained in more detail with reference to drawings which show embodiments intended only as examples. The drawings show.

DETAILED DESCRIPTION OF THE PREFERRED EMBODIMENTS

Figure 1:
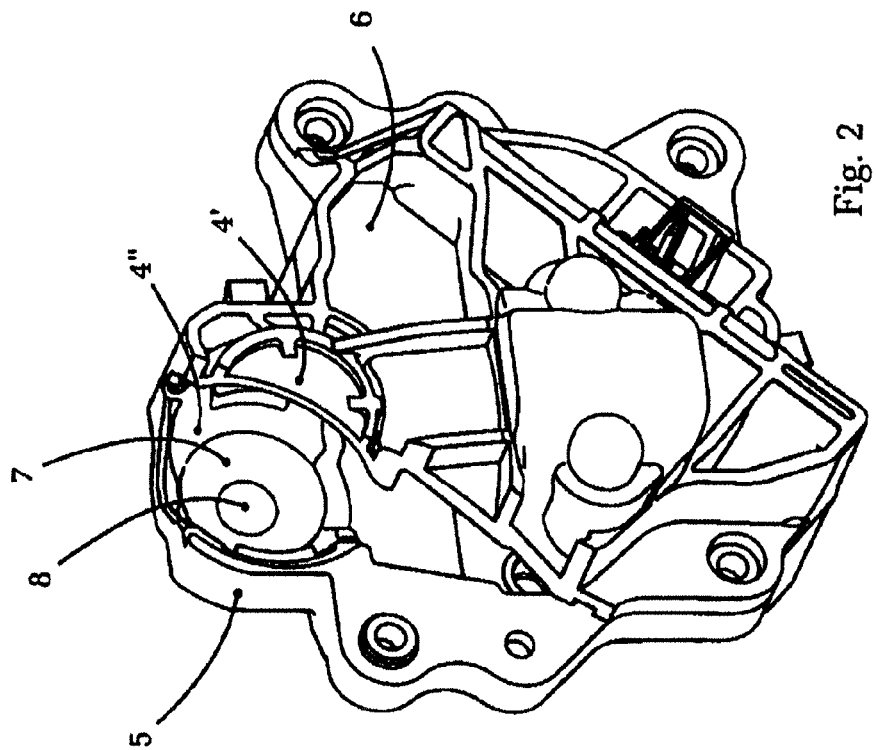
FIG. 1: Schematic, isometric and partially sectioned view of an embodiment of the actuating device according to the present invention.

FIG. 1 shows a schematic, isometric view of an embodiment of an actuating device according to the present invention. This example embodiment is an actuating device or selector lever for an automated vehicle transmission.

In the representation shown in FIG. 1 can be seen, first, the actuating element in the form of a rod-shaped shift lever 1, this shift lever 1 being mounted by means of a ball-and-socket joint 3 so that it can pivot relative to a base housing 2. For this purpose the shift lever 1 is fixed to a ball stud 3 which, for its part, is held and can slide within a ball socket arranged in the base housing 2 of the actuating device.

Thus, the shift lever 1 can be moved forward and backward relative to the driving direction, as well as to one side and the other transversely to the driving direction, for example in order to select the various gates of the selector lever device or the various gear ratios of the automatic transmission.

In this case the ball socket 4 is formed essentially of two socket half-shells 4' and 4". In turn, the two socket half-shells 4' and 4" are made integrally, each respectively with one of the housing halves 5, 6 of the base housing 2, so that already the production and assembly of the base housing 2 or the actuating device are made extremely simple.

Figure 2:
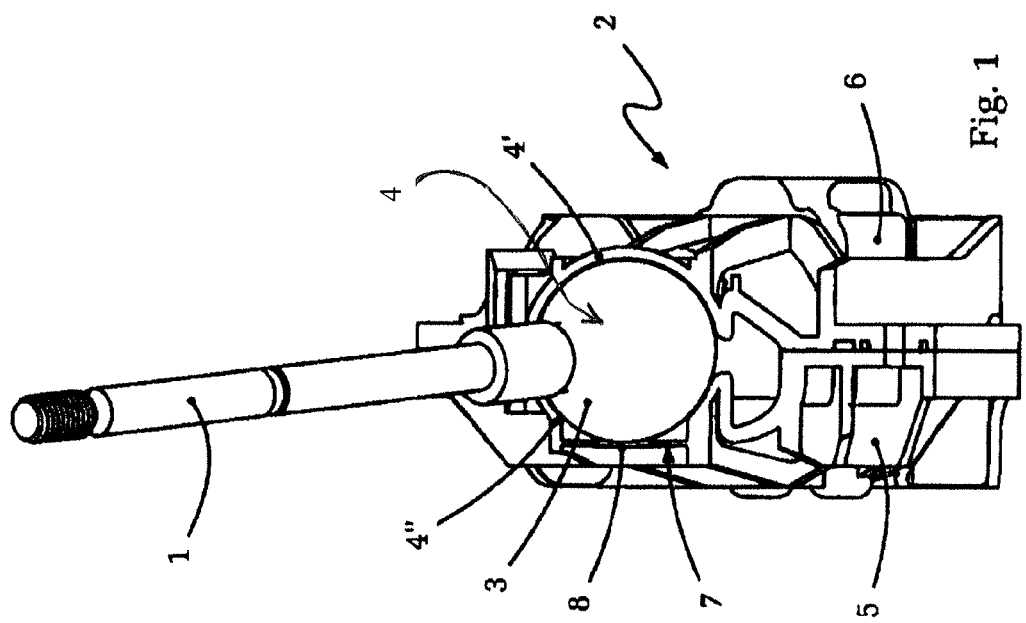
FIG. 2: Schematic, isometric view of the base housing of the actuating device shown in FIG. 1, in partially sectioned form.

This is also made clear by the representation in FIG. 2, which shows the base housing 2 of the actuating device in a partially sectioned, oblique view. Here too, the two housing halves 5, 6 of the base housing 2 can be seen, each of the two housing halves 5, 6 containing one of the two ball socket half-shells 4' and 4". FIG. 2 also shows clearly the integral formation of the ball socket half-shells 4' and 4" with their respective housing halves 5, 6, which results in structural simplification and hence cost savings.

Figures 4, 5:
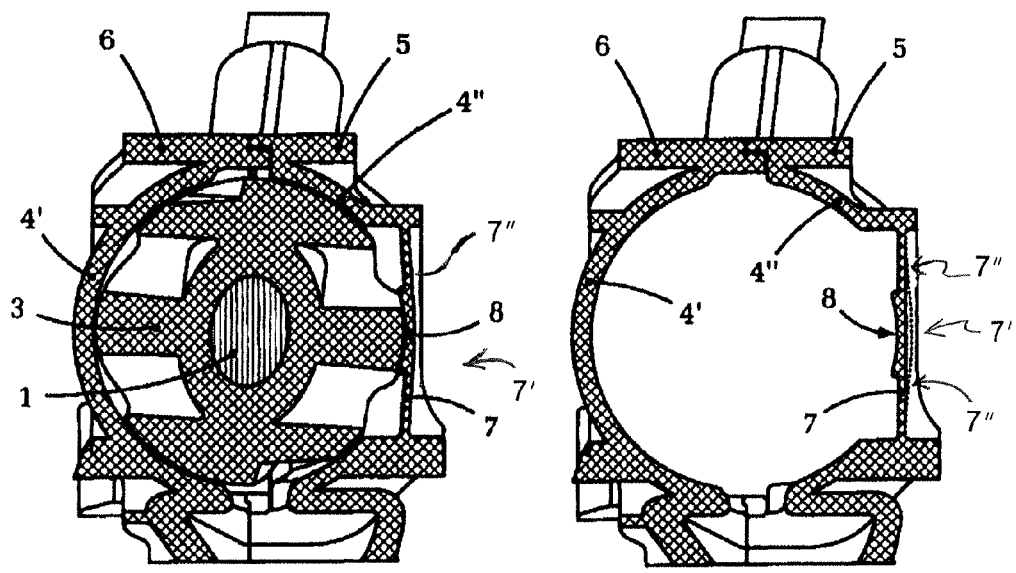
FIG. 4: Enlarged view of the oblique section A-A through the base housing and the ball stud of the actuating device shown in FIG. 3.
FIG. 5: Representation corresponding to FIG. 4, showing the section A-A through the base housing in FIG. 4, without the joint ball.

For the purpose of play-free guidance of the ball stud 3 together with the actuating lever 1 in the base housing 2 or in the ball socket half-shells 4', 4", the ball socket half-shell 4" on the right in FIG. 4 includes a prestressing means 7' in the form of a circular membrane 7 with a pressure contact element 8 arranged centrally on the circular membrane 7 for guiding the ball stud 3 wherein, as shown in FIG. 4, the pressure contact element 8 is integral with circular membrane 7 and the circular membrane 7 is integral with the ball socket half-shell 4". As shown in FIG. 4, the ball socket half-shell 4" includes at least one recess containing the circular membrane 7 which includes an elastic surface zone 7" which is flexible, in the radial direction of the ball socket 4, and includes pressure contact element 8 which is arranged substantially centrally on the elastic surface zone 7" and will bear against the ball stud of the actuating element. It can be seen that when the two halves 5, 6 of the base housing 2 are assembled together, the membrane 7 is deformed by the ball stud 3 slightly outward, or to the right in FIG. 4, whereby corresponding tensile forces are produced in the plane of the membrane 7 so that restoring forces act in the direction toward the joint ball 3.

The circular membrane 7 and the pressure contact element 8 arranged on it for contacting and guiding the ball stud can also be seen clearly in FIG. 2, although in FIG. 2 the ball stud has been omitted for the sake of clearer representation.

Figure 3:
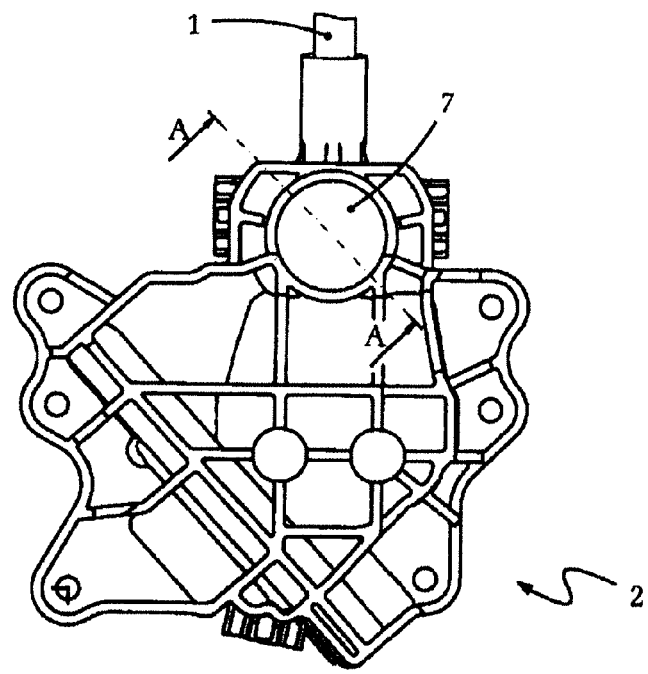
FIG. 3: Schematic rear view of the base housing of the actuating device in FIGS. 1 and 2.

FIG. 3 again shows the base housing 2 according to FIG. 2, but this time seen from the rear. The section line indicated in FIG. 3 shows the course of the oblique section A-A through the ball stud 3, through the socket half-shells 4' and 4" and also through the rod of the actuating lever 1, and the section surface along the oblique section A-A is reproduced in FIG. 4.

In FIG. 4 can be seen, first, the ball stud 3, which in the example embodiment illustrated is made in the form of a skeleton-type plastic ball 3 in order to save material and for greater accuracy of shape. In the section surface shown in FIG. 4 the actuating lever 1 appears as an ellipse, because the actuating lever 1, with its circular cross-section as in FIG. 3, has been sectioned at an acute angle.

FIG. 4 also shows the two housing halves 5, 6 of which the base housing 2 of the actuating device consists, and in addition the two ball socket half-shells 4' and 4" in which the ball stud 3 of the actuating lever 1 is held and can slide. In this case the ball socket half-shell 4" on the right in the drawing again contains the prestressing means with the circular membrane 7 and with the pressure contact element 8 arranged on the membrane. It can be seen clearly in FIG. 4 that owing to the contact between the pressure contact element 8 and the joint ball 3, the circular membrane 7 has been deformed outward, or to the right, to an outwardly-deformed position. Due to the integral connection of of the membrane 7 to the ball socket half-shell 4" around the circumference of the membrane 7, such as by membrane 7 being an integral part of the ball socket half-shell 4" or by membrane 7 being clamped to the ball socket half-shell 4", this produces considerable tensile forces in the plane of the membrane, which in turn act to produce corresponding restoring forces exerted by the pressure contact element 8 in the direction of the joint ball 3.

FIG. 5 again shows the section through the base housing as in FIG. 4, but in FIG. 5 the ball stud 3 and the actuating lever 1 have been omitted or removed from the base housing 2. Accordingly, in FIG. 5 the membrane 7 and the pressure contact element 8 are in their force-free, neutral position, which is different from the outwardly-deformed position shown in FIG. 4. The force-free, neutral position of the membrane 7 and its pressure contact element 8 can be seen particularly clearly in FIG. 5 by contrast with the outer contour of the membrane 7, indicated by the broken line, in its deflected position as in FIG. 4. Thus, in the force-free, neutral position shown in FIG. 5 the contact surface of the pressure contact element 8 of the membrane 7 is closer to the mid-point of the ball stud 3 than is the outer surface of the ball stud 3 itself.

In this way the ball stud 3 and the actuating lever 1 connected to the ball stud 3 are held, by the contact forces produced by the deformation of the membrane 7, free from play and rattling in the ball socket 4' 4" until the selector lever or actuating lever 1 is operated. During such operation, as in known, in response to the direction of the actuating force the ball stud 3 rests against the area of the ball socket 4', 4" opposite the force action direction, so that the full actuating forces are reliably taken up and can at the same time be transferred with the least possible friction losses.

Consequently, it is clear that the invention provides an actuating device which has decisive advantages, primarily in relation to more enduring freedom from play and maintenance. In particular, with this invention the drawbacks of actuating devices with play-free lever guiding, as known from the prior art, are improved upon or eliminated.

Accordingly, the invention contributes toward the creation of robust and lastingly play-free actuating devices, in particular for gearshift transmissions. At the same time, owing to design simplification it makes possible and because the number of components is reduced, the invention provides potential for cost savings.

LIST OF INDEXES

1 Shift lever, actuating element
2 Base, base housing
3 Ball stud
4', 4" Ball socket half-shells
5, 6 Housing halves
7 Membrane, flexible elastic surface zone
8 Pressure contact element

The invention claimed is:

1. An actuating device comprising:
   an actuating element that is fixed to a ball stud which is pivotable relative to a base, a ball socket is arranged in the base and supports the ball stud such that the actuating element is movable relative to the base within at least one pivot plane and between at least two shift positions,
   at least one recess of the ball socket includes a prestressing element having an elastic surface zone which is flexible in a radial direction of the ball socket, the flexible elastic surface zone having a pressure contact element located centrally on the elastic surface zone which bears against the ball stud,
   wherein a contact surface of the pressure contact element is spaced at a radial distance smaller than the radius of the ball stud away from a center point of the ball socket so that
      when the contact surface of the pressure contact element is not in contact with a ball stud, the contact surface of the pressure contact element is in a force-free, neutral position, and
      when the ball stud is retained in the ball socket and in contact with the contact surface of the pressure contact element, the elastic surface zone is biased into a stressed position and the contact surface of the pressure contact element directly contacts the ball stud and presses the ball stud into contact with an inner surface of the ball socket.

2. The actuating device according to claim 1, wherein the ball socket comprises two socket half-shells and the recess of the ball socket, containing the flexible elastic surface zone, is arranged in a first one of the two socket half-shells.

3. The actuating device according to claim 2, wherein both the pressure contact element and the flexible elastic surface zone are integral with the first one of the two ball socket half-shells.

4. The actuating device according to claim 2, wherein the prestressing element is formed by a membrane which is flat the force-free, neutral position and the membrane is either clamped or integrally connected to the associated socket half-shell completely around its outer circumference.

5. The actuating device according to claim 2, wherein the elastic surface zone is flexible, in the radial direction, with respect to at least the first one of the two socket half-shells.

6. The actuating device according to claim 2, wherein only the elastic surface zone is arranged in only one socket half-shell.

7. The actuating device according to claim 1, wherein the base comprises two housing halves, each of the two housing halves is respectively integral with one of the two ball socket half-shells.

8. The actuating device according to claim 7, wherein the first and second housing halves are fixedly attached to one another.

9. The actuating device according to claim 1, wherein a cavity is directly adjacent a radially outer surface of the pressure contact element, and the pressure contact element flexes into the recess only when the ball stud is present in the ball socket.

10. The actuating device according to claim 1, wherein only one elastic surface zone is present.

11. The actuating device according to claim 1, wherein a radially exterior surface of the pressure contact element is not rigidly supported radially.

12. The actuating device according to claim 1, wherein the contact surface of the pressure contact element, when stressed by the prestressing element, elastically flexes and is deformed radially away from a center point of the ball socket, but when the prestressing element is in a force-free, neutral position element, the contact surface elastically flexes back to a undeformed position spaced at a radial distance away from a center point of the ball socket which is smaller than the radius of the ball stud.

13. An actuating device for selecting gear ratios in a manual transmission, the actuating device comprising:
   a ball stud having a remote end coupled to an actuating lever, the ball stud being supported within a socket housing such that the actuating lever is pivotable within at least one pivot plane between at least two shift positions relative to the socket housing;

the socket housing comprising first and second housing halves, the second housing half having a socket half shell, the first housing half having a socket half shell with an inner surface and a recess, the recess in the socket half shell including a prestressing element having an elastic surface zone which is flexible in a radial direction of the ball socket, and a central portion of the elastic surface area having a pressure contact element, the contact surface of the pressure contact element being spaced a radial distance smaller than the radius of the ball stud away from a center point of the ball socket, when the elastic surface zone is in a relaxed position;

the first housing half engaging the second housing half such that the socket half shell of the first housing half and the socket half shell of the second housing half form a spherical ball socket which retains the ball stud therein; and the ball stud contacting the pressure contact element of the elastic surface area and the inner surface of the socket half shell of the first housing half, when the ball stud is retained in the ball socket, such that the elastic surface area is biased into a stressed position, and when the ball stud is not retained in the ball socket, the elastic surface area is in the relaxed position, wherein the ball socket comprises an inner surface and the ball stud directly contacts the contact surface of the pressure contact element and the inner surface of the ball socket, and the elastic surface zone is prestressed such that the contact surface of the pressure contact element directly contacts the ball stud and presses the ball stud into direct contact with an inner surface of the ball socket.

* * * * *